(12) United States Patent
Ozaki

(10) Patent No.: US 9,258,532 B2
(45) Date of Patent: Feb. 9, 2016

(54) PORTABLE TERMINAL DEVICE AND STORAGE MEDIUM

(75) Inventor: Yukisuke Ozaki, Hyogo (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 491 days.

(21) Appl. No.: 13/806,579

(22) PCT Filed: Jul. 12, 2011

(86) PCT No.: PCT/JP2011/065856
§ 371 (c)(1),
(2), (4) Date: Dec. 21, 2012

(87) PCT Pub. No.: WO2012/008434
PCT Pub. Date: Jan. 19, 2012

(65) Prior Publication Data
US 2013/0107053 A1    May 2, 2013

(30) Foreign Application Priority Data

Jul. 13, 2010 (JP) .................. 2010-159198

(51) Int. Cl.
*G01C 21/36* (2006.01)
*G08G 1/005* (2006.01)
*H04N 7/18* (2006.01)
*G08G 1/14* (2006.01)

(52) U.S. Cl.
CPC .............. *H04N 7/18* (2013.01); *G01C 21/3602* (2013.01); *G01C 21/3623* (2013.01); *G08G 1/005* (2013.01)

(58) Field of Classification Search
None
See application file for complete search history.

(56) References Cited

U.S. PATENT DOCUMENTS

| | | | |
|---|---|---|---|
| 2003/0122687 A1* | 7/2003 | Trajkovic et al. | 340/932.2 |
| 2009/0150073 A1* | 6/2009 | Caraballo | 701/210 |
| 2009/0251333 A1* | 10/2009 | Itani et al. | 340/932.2 |
| 2010/0070173 A1* | 3/2010 | Sakamoto | 701/209 |
| 2010/0073201 A1* | 3/2010 | Holcomb et al. | 340/990 |

FOREIGN PATENT DOCUMENTS

| | | |
|---|---|---|
| CN | 101238500 A | 8/2008 |
| JP | A-2003-85696 | 3/2003 |
| JP | A-2008-202967 | 9/2008 |

OTHER PUBLICATIONS

Chinese Office Action issued in Chinese Patent Application No. 201180033362.5 on Aug. 15, 2014 (with translation).
Aug. 9, 2011 Written Opinion issued in International Patent Application No. PCT/JP2011/065856 (with translation).

* cited by examiner

*Primary Examiner* — Jay Patel
*Assistant Examiner* — Reza Aghevli
(74) *Attorney, Agent, or Firm* — Oliff PLC

(57) ABSTRACT

There is provided a portable terminal device and a storage medium having stored therein a parking position guiding program, which are capable of accurately assisting a search of a parking position when a user goes back to a parking position. A portable terminal device is configured to acquire position information representing a current position of a vehicle, stores the position information in a storage unit when the accuracy of the acquired position information satisfies a predetermined accuracy, and give a notice to a user to image an image of a surrounding area when the accuracy of the acquired position information does not satisfy a predetermined accuracy.

5 Claims, 13 Drawing Sheets

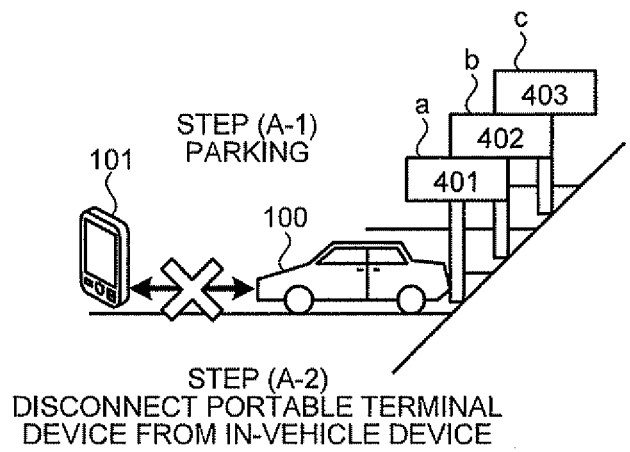
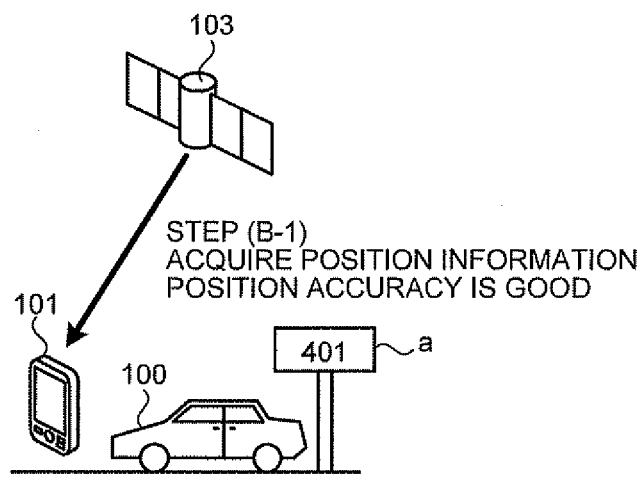
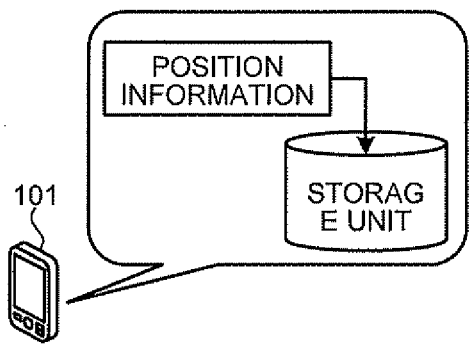

STEP (C-1)
ACQUIRE POSITION INFORMATION
POSITION ACCURACY IS BAD

STEP (C-2)
DISPLAY WARNING IMAGE

STEP (C-3)
IMAGE MARK

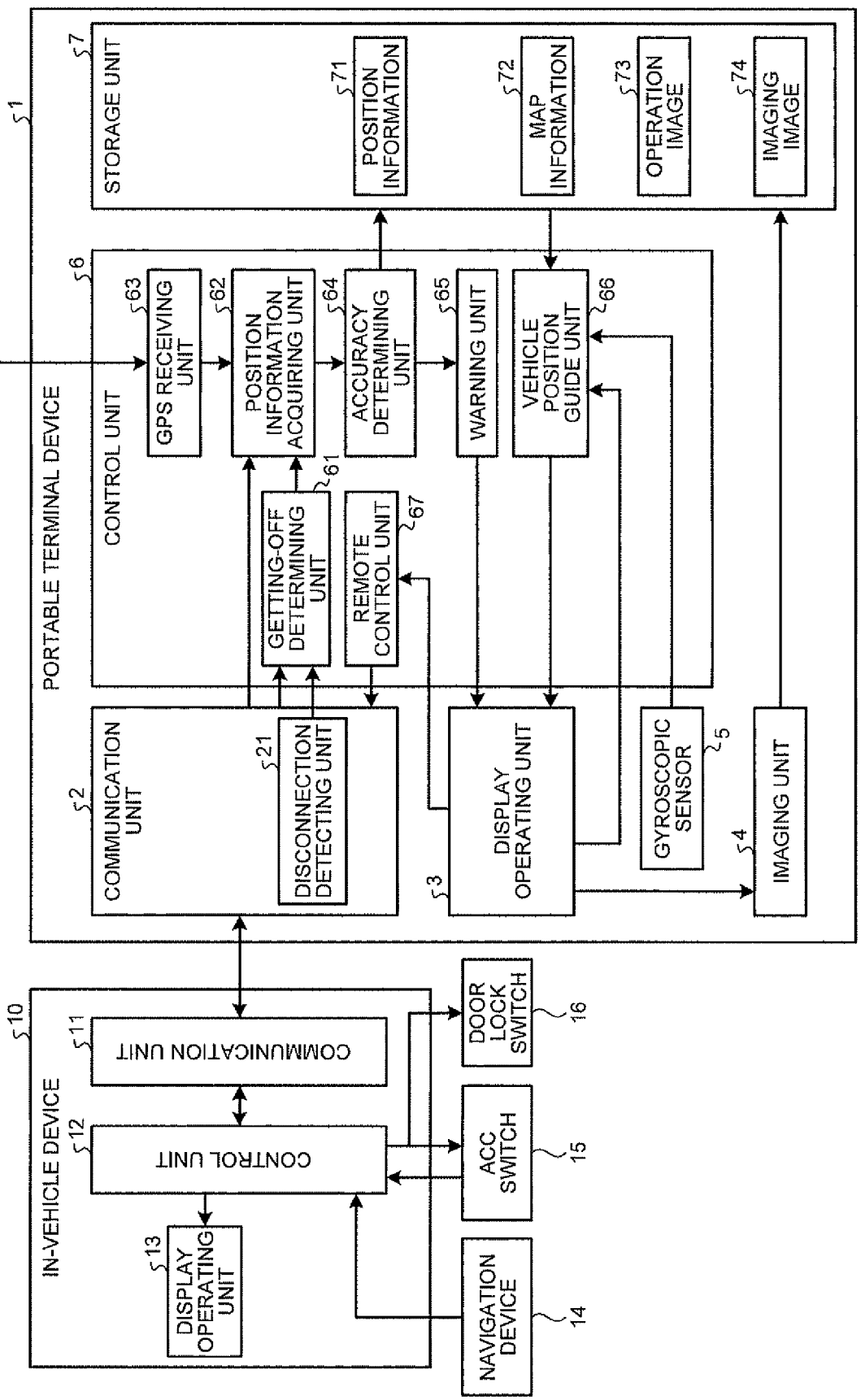

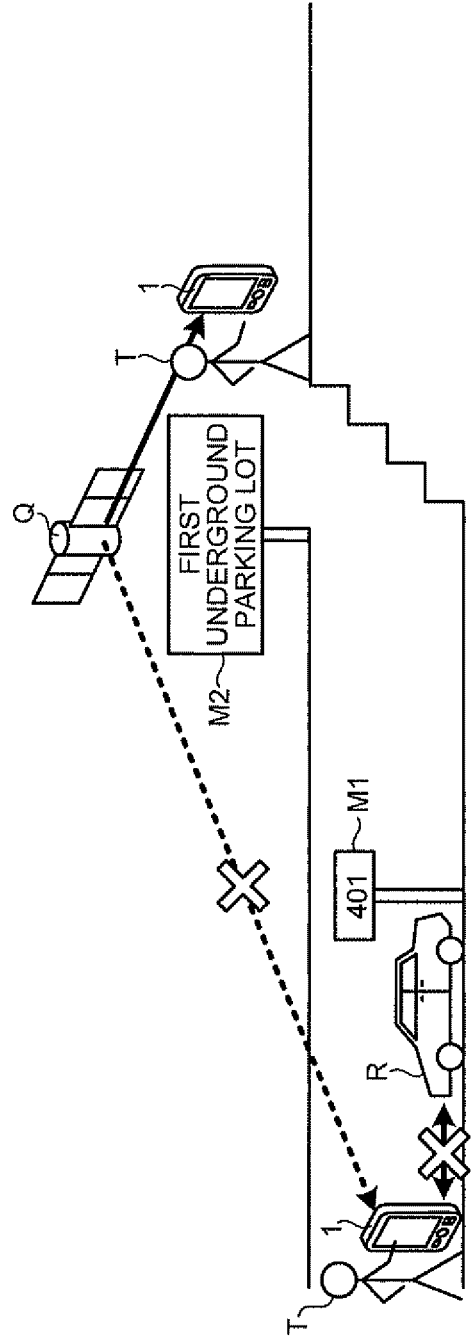

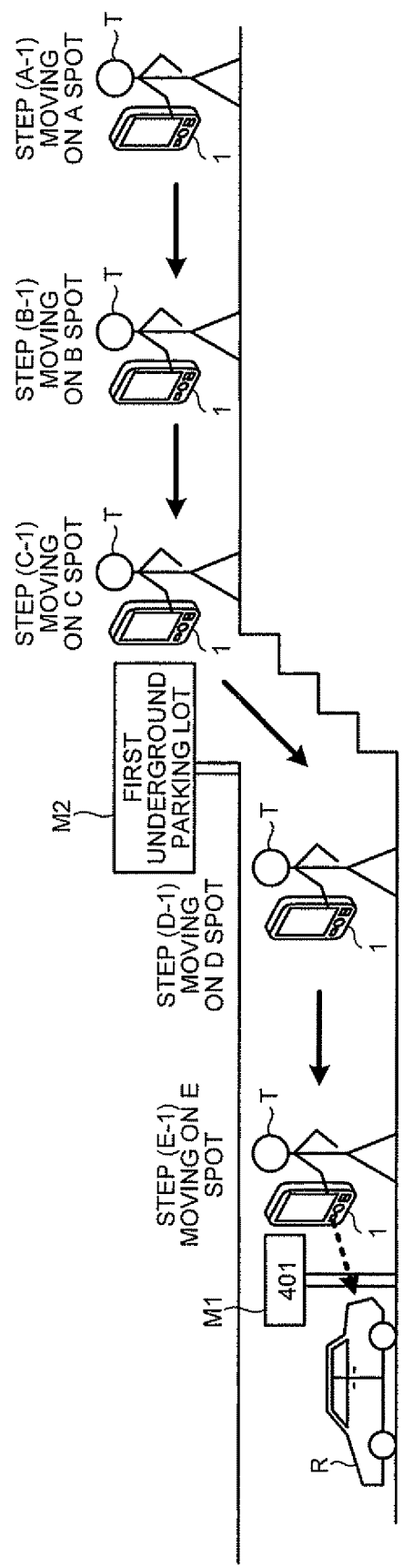

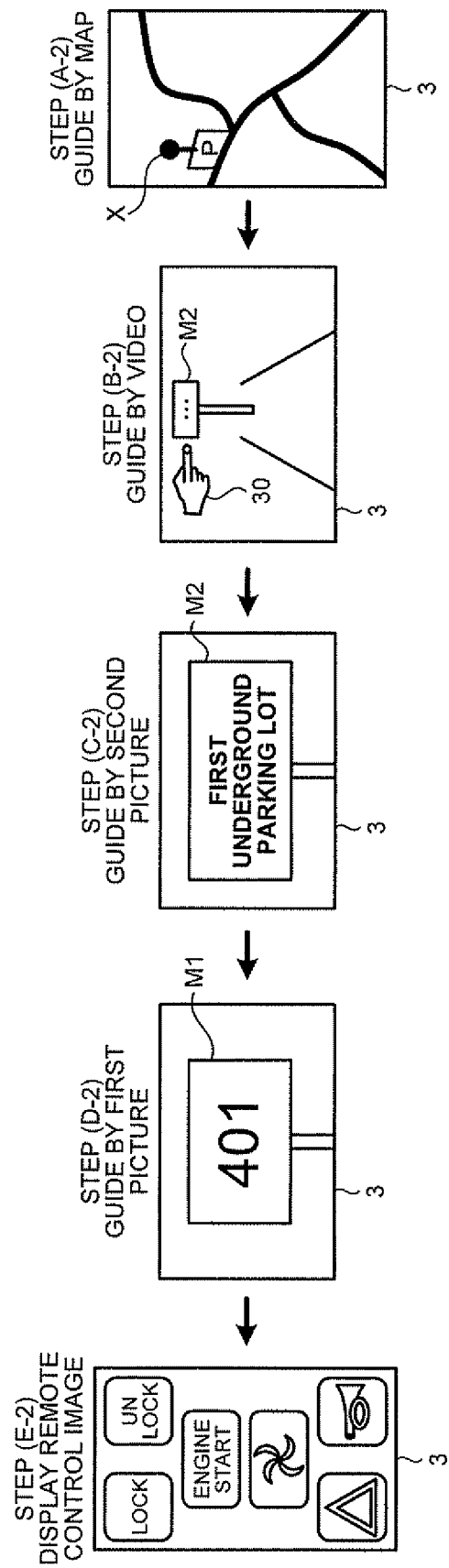

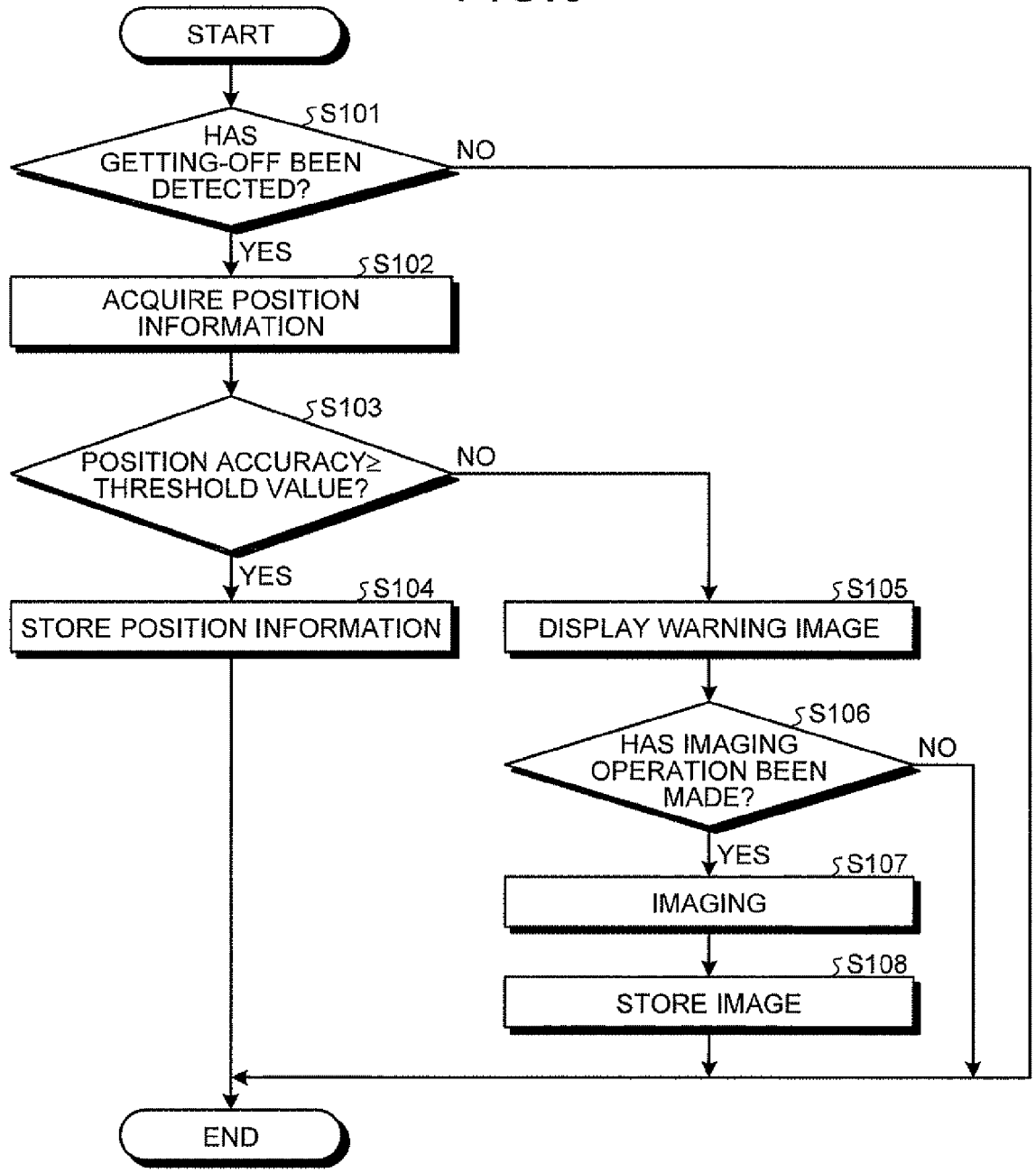

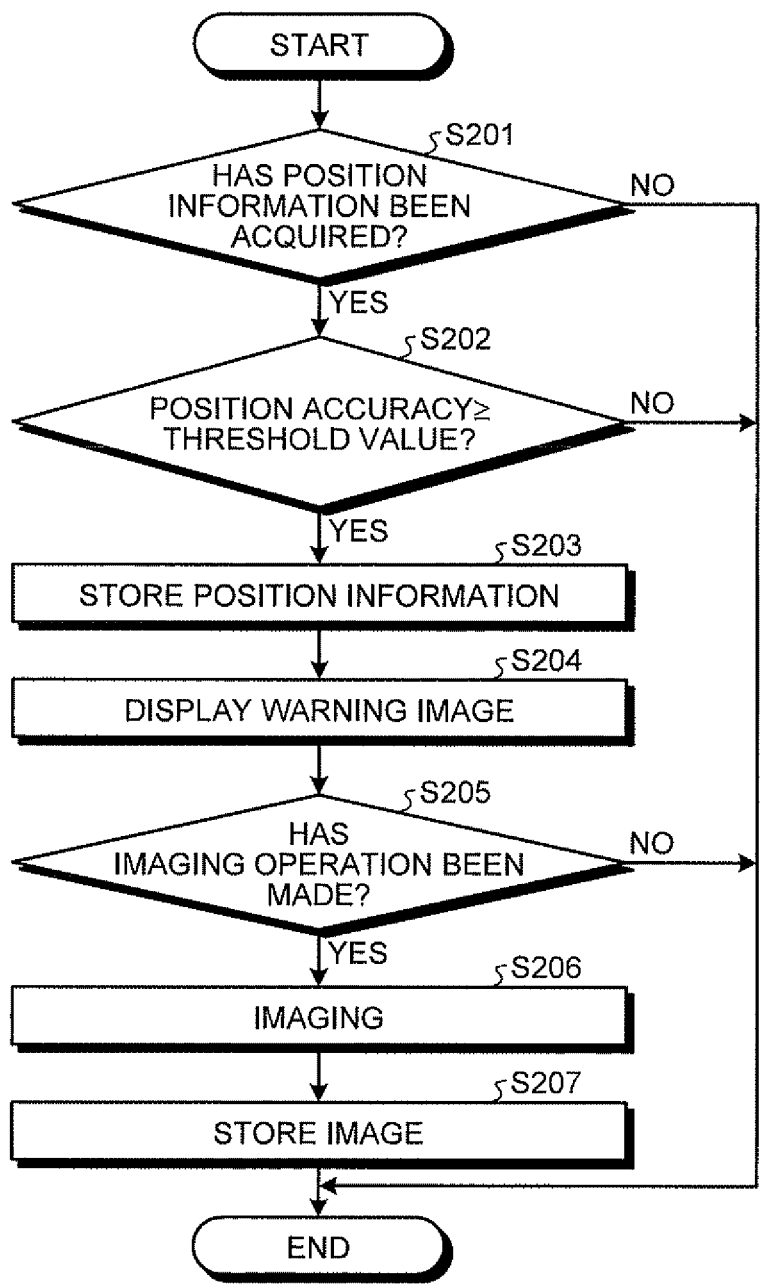

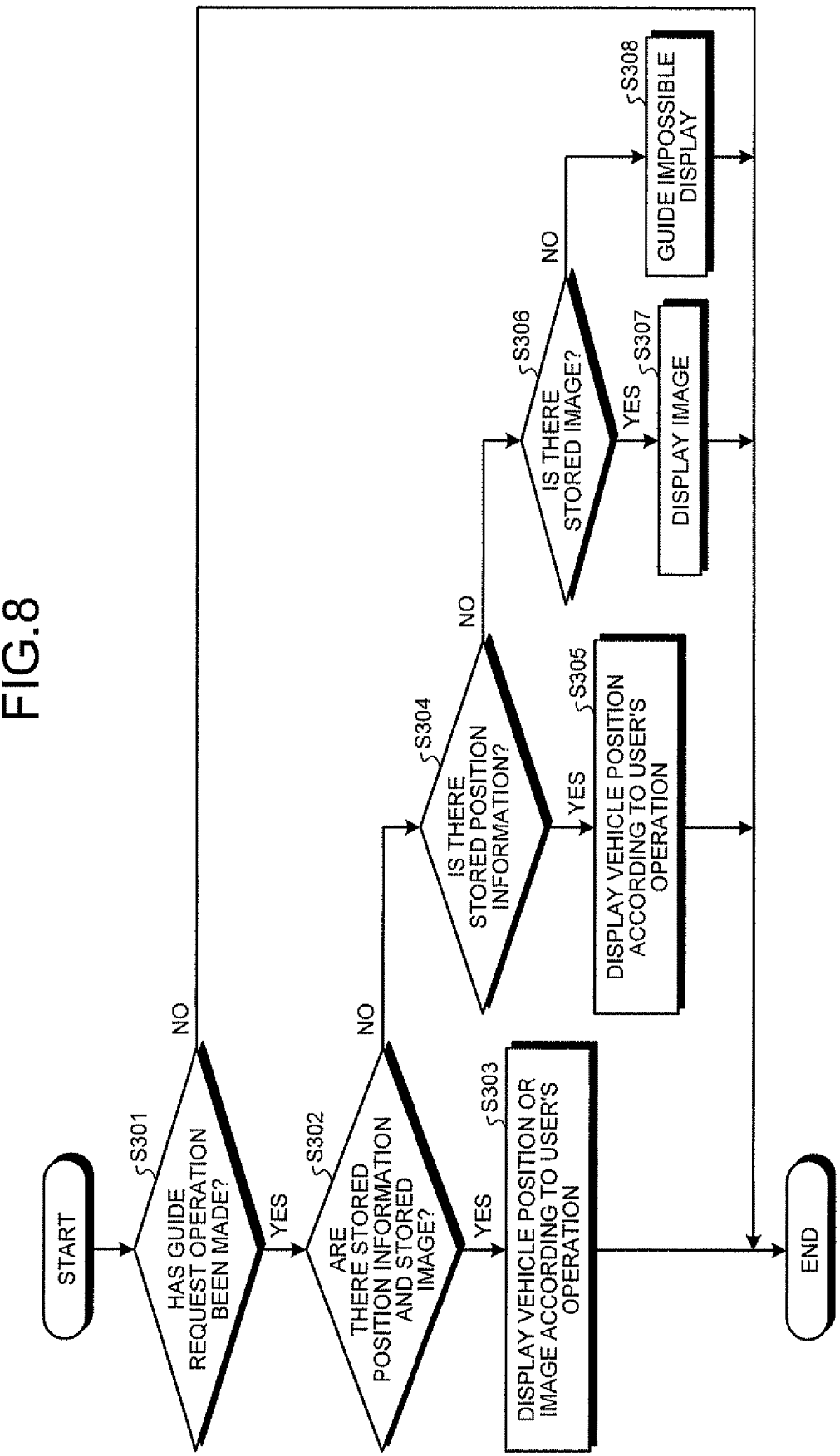

PORTABLE TERMINAL DEVICE AND STORAGE MEDIUM

FIELD

The present invention relates to a portable terminal device and a storage medium, and more particularly, to a portable terminal device and a storage medium having stored therein a parking position guiding program, which are capable of accurately assisting a search of a parking position when a user goes back to a parking position.

BACKGROUND

In the past, when a user of a vehicle parks his/her vehicle in a large-scale parking lot, there are cases in which the user forgets a parking position, and so an excessive time is taken until the user goes back to the parking position. For this reason, there have been proposed techniques of assisting the search of the parking position when the user goes back to the parking position.

For example, Patent Literature 1 discloses a technique by which a search of a parking position is assisted such that when a parking start of a vehicle is detected, an image of an area around the vehicle imaged by a camera mounted in the vehicle is transmitted to a portable terminal device carried by a user.

According to this technique, when the user goes back to the parking position, the transmitted image of the area around the vehicle is displayed on the portable terminal device, and it is possible to search for the parking position with reference to this image. Thus, it is possible to reduce a time taken until the user goes back to the parking position.

CITATION LIST

Patent Literature

Patent Literature 1: JP 2008-202967 A

SUMMARY

Technical Problem

However, in the portable terminal device discussed in Patent Literature 1, there is a problem in that there is a case in which it is difficult to accurately assist the search of the parking position.

In other words, in the technique discussed in Patent Literature 1, the image of the surrounding area captured by the camera mounted in the vehicle is transmitted to the portable terminal device when parking starts. Thus, there are cases in which a subject serving as a mark of the parking position is not shown in the image when the image is displayed on the portable terminal device.

In this case, when the user goes back to the parking position, although the image of the area around the parked vehicle is displayed on the portable terminal device, it is difficult for the portable terminal device to accurately assist the search of the parking position since a subject serving as a mark of the parking position is not shown in the image.

In this regard, there is a great need for a portable terminal device and a parking position guiding program, which are capable of accurately assisting the search of the parking position when the user goes back to the parking position.

The invention is made in light of the foregoing and directed to provide a portable terminal device and a parking position guiding program, which are capable of accurately assisting the search of the parking position when the user goes back to the parking position.

Solution to Problem

To solve the problems as described above and to achieve an object, a portable terminal device includes an imaging unit and a position information acquiring unit that acquires position information, in which the portable terminal device includes: an accuracy determining unit that determines an accuracy of the position information acquired by the position information acquiring unit; and a notifying unit that gives a notice to a user of the portable terminal device to image an image of a surrounding area when the accuracy determined by the accuracy determining unit does not satisfies a predetermined accuracy.

Advantageous Effects of Invention

According to the invention, for example, when the accuracy of the position information representing the current position of the vehicle acquired when the user gets off the vehicle is low, it is possible to encourage the user to capture an image of an area around the vehicle, and thus the user can take a picture of a mark of the parking position. Thus, according to the invention, the user can search for the parking position with reference to the picture, and thus there is an effect by which the search of the parking position can be accurately assisted when the user goes back to the parking position.

BRIEF DESCRIPTION OF DRAWINGS

FIG. 1A is a diagram illustrating an outline of an operation of a portable terminal device according to the invention.

FIG. 1B is a diagram illustrating an outline of an operation of a portable terminal device according to the invention.

FIG. 1C is a diagram illustrating an outline of an operation of a portable terminal device according to the invention.

FIG. 2 is a block diagram illustrating configurations of a portable terminal device and an in-vehicle device connected with the portable terminal device according to the present embodiment.

FIG. 4A is a diagram illustrating an operation of a portable terminal device when a user parks a vehicle and gets off according to the present embodiment.

FIG. 5A is a diagram illustrating an operation of a portable terminal device when a user goes back to a parked vehicle according to the present embodiment.

FIG. 5B is a diagram illustrating an operation of a portable terminal device when a user goes back to a parked vehicle according to the present embodiment.

FIG. 6 is a flowchart illustrating a process executed by a portable terminal device according to the present embodiment.

FIG. 7 is a flowchart illustrating a process executed by a portable terminal device according to the present embodiment.

FIG. 8 is a flowchart illustrating a process executed by a portable terminal device according to the present embodiment.

DESCRIPTION OF EMBODIMENTS

Hereinafter, an embodiment of a portable terminal device and a parking position guiding program according to the invention will be described in detail with reference to the accompanying drawings. First, before a detailed description of an embodiment is given, an outline of an operation of a portable terminal device according to the invention will be described with reference to FIGS. 1A to 1F. FIGS. 1A to 1F are diagrams illustrating an outline of an operation of a portable terminal device 101 according to the invention.

In the following, a mobile telephone in which a parking position guiding program according to the invention is installed is described as an example of the portable terminal device 101 according to the invention. In addition, the portable terminal device 101 is assumed to be connected with a predetermined in-vehicle device inside a vehicle 100 in a wired or wireless manner and to have a function of controlling operations of various kinds of vehicle-mounted devices in collaboration with the in-vehicle device.

As illustrated in FIGS. 1A to 1F, the portable terminal device 101 acquires position information representing the current position of the vehicle 100 when the user parks the vehicle 100, and causes the user to capture an image of a surrounding area when the accuracy of the acquired position information is low.

As a result, when the user goes back to the parking position, the image of the area around the vehicle 100 captured by the user at the time of getting-of is displayed on the portable terminal device 101, and thus the portable terminal device 101 can accurately assist the user to search for the parking position.

Figure 1D:
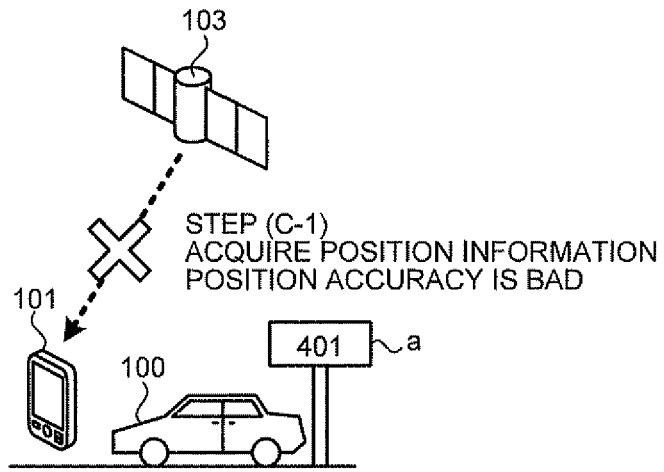
FIG. 1D is a diagram illustrating an outline of an operation of a portable terminal device according to the invention.

For example, when the user parks the vehicle 100 in a parking lot as illustrated in FIG. 1A (see step (A-1)), the portable terminal device 101 operates as follows Here, a, b, and c illustrated in FIGS. 1A to 1F are plates respectively installed in parking spaces, which are used to identify the parking spaces of the parking lot.

In this case, when the user parks his/her vehicle and so a connection between the portable terminal device 101 and the in-vehicle device mounted in the vehicle 100 is disconnected as illustrated in FIG. 1A (see step (A-2)), the portable terminal device 101 acquires the position information of the vehicle 100 as illustrated in FIG. 1B (see step (B-1)).

At this time, the portable terminal device 101 receives a signal transmitted from a global positioning system (GPS) satellite 103, and acquires position information representing the current position of the vehicle 100 based on the received signal.

Here, when the vehicle 100 has a GPS function, the portable terminal device 101 may acquire the position information representing the parking position from the vehicle 100 in advance immediately before a connection with the in-vehicle device is disconnected.

Alternatively, the portable terminal device 101 may be configured to acquire an Internet protocol (IP) address of a relay device from the relay device of a wireless local area network (LAN) installed in the surrounding area and acquire the position information based on the IP address.

Next, the portable terminal device 101 acquires the accuracy (hereinafter, referred to as "position accuracy") of the acquired position information. For example, the portable terminal device 101 determines a circular area corresponding to a geographical area which can be used to specify the position at which the vehicle 100 is parked based on the acquired position information, and calculates shortness of the diameter (for example, a reciprocal of the diameter) of the circular area as the position accuracy.

At this time, the position accuracy calculated by the portable terminal device 101 decreases as a signal level or a reception frequency of the signal that the portable terminal device 101 receives from the GPS satellite 103 decreases. Then, when the calculated position accuracy satisfies a predetermined accuracy, for example, when the calculated position accuracy is a predetermined threshold value or more, the portable terminal device 101 determines that the position accuracy is good.

However, when the calculated position accuracy is less than the predetermined threshold value, the portable terminal device 101 determines that the position accuracy is bad. Further, even when it is difficult to acquire the position information, the portable terminal device 101 determines that the position accuracy is bad.

Then, when the position accuracy of the acquired position information is good (see step (B-1)) as illustrated in FIG. 1B, the portable terminal device 101 stores the position information in a storage unit as illustrated in FIG. 1C (see step (B-2)). As a result, when the user goes back to the parking position later, the portable terminal device 101 can assist the search of the parking position, for example, by causing the parking position of the vehicle 100 to be displayed on a map based on the position information stored in the storage unit.

Further, the portable terminal device 101 acquires the position information of the parking position using the fact that a connection between the portable terminal device 101 and the in-vehicle device is disconnected when the user gets off a vehicle as a trigger. Thus, the portable terminal device 101 can acquires the position information of the parking position with a high degree of accuracy even although the user does not intentionally perform an operation of acquiring the position information of the parking position.

Figure 1E:
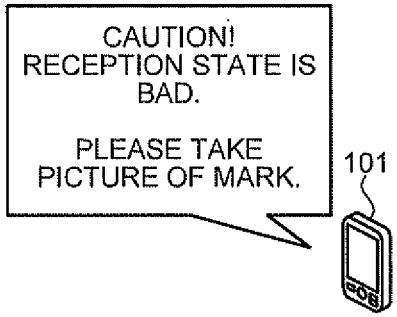
FIG. 1E is a diagram illustrating an outline of an operation of a portable terminal device according to the invention.

Meanwhile, when the position accuracy of the acquired position information is bad (see step (C-1)) as illustrated in FIG. 1D, the portable terminal device 101 displays a warning image for the user as illustrated in FIG. 1E (see step (C-2)).

For example, the portable terminal device 101 encourages the user to capture an image of a surrounding area by displaying a warning image including a message such as "Caution! A reception state is bad. Please take a picture of a mark." through a display unit.

Figure 1F:
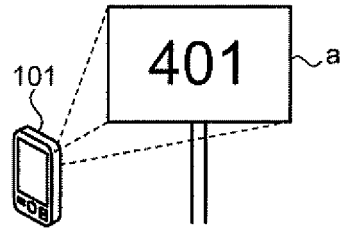
FIG. 1F is a diagram illustrating an outline of an operation of a portable terminal device according to the invention.

As the warning image is displayed, the user captures the plate a serving the mark of the parking position by a camera installed in the portable terminal device 101 as illustrated in FIG. 1F (see step (C-3)). Thereafter, the portable terminal device 101 stores an image (picture) of the plate a captured by the user in the storage unit.

Thus, when the user goes back to the parking position later, the portable terminal device 101 can assist the search of the parking position such that the picture of the plate a stored in the storage unit is displayed on the display unit, and thus the mark of the parking position is provided to the user.

As described above, when the user gets off the vehicle 100, if the position accuracy of the acquired position information is bad, the portable terminal device 101 according to the invention encourages the user to capture the image of the surround area and thus can cause a picture serving as the mark of the parking position to be imaged.

Thus, according to the portable terminal device 101 of the invention, even when the vehicle 100 is parked at a place in which it is difficult to specify the parking position of the vehicle 100 based on the position information, it is possible to assist the search of the parking position through an image of an area around the parking position captured by the user.

Here, the example in which the user is encouraged to capture an image of a surrounding area by the warning image has been described, but the invention is not limited to this example. For example, a message to encourage capturing of an image of a surrounding area may be voice-output from the portable terminal device 101. In the following, an embodiment of the portable terminal device described with reference to FIGS. 1A to 1F will be described in detail with reference to FIGS. 2 to 8.

[Embodiment]

FIG. 2 is a block diagram illustrating configurations of a portable terminal device 1 and an in-vehicle device 10 connected with the portable terminal device 1 according to the present embodiment. In FIG. 2, only components necessary for describing a feature of the portable terminal device 1 according to the present embodiment are illustrated, and general components are not illustrated.

The portable terminal device 1 illustrated in FIG. 2 is a mobile telephone in which the parking position guiding program according to the present invention is installed, and is connected to perform communication with the in-vehicle device 10 mounted in the vehicle in a wired or wireless manner. In addition, the portable terminal device 1 has a function of controlling operations of various kinds of vehicle-mounted devices in collaboration with the in-vehicle device 10.

Here, before a configuration of the portable terminal device 1 is described, first, a configuration of the in-vehicle device 10 will be shortly described. The in-vehicle device 10 includes a communication unit 11, a control unit 12, and a display operating unit 13 as illustrated in FIG. 2.

The communication unit 11 is a communication interface that transmits or receives various kinds of information to or from the portable terminal device 1. In other words, the communication unit 11 is a processing unit that outputs various kinds of information input from the control unit 12 to the portable terminal device 1, and outputs various kinds of information input from the portable terminal device 1 to the control unit 12.

The control unit 12 includes an information processing device that includes a central processing unit (CPU), a read only memory (ROM), and a random access memory (RAM). The control unit 12 is connected with various kinds of vehicle-mounted devices such as a navigation device 14, an accessory (ACC) switch 15, and a door lock switch 16. The ACC switch 15 is a switch that performs switching between supply of electric power to the in-vehicle device 10 and stop of electric power supply.

The control unit 12 controls operations of various kinds of vehicle-mounted devices such that the CPU reads various kinds of programs from the ROM and executes the read program using the RAM as a work area. For example, the control unit 12 performs door locking, door unlocking, engine start-up, or the like according to control information input from the portable terminal device 1 through the communication unit 11.

Further, the control unit 12 controls an operation of the navigation device 14, blinking of a hazard lamp, an operation of a car air conditioner, or the like according to the control information from the portable terminal device 1. The control unit 12 further has a function of transmitting the position information representing the current position of the vehicle acquired by the navigation device 14, information representing the state of the ACC switch 15, or the like to the portable terminal device 1.

The display operating unit 13 is a display device that includes a touch panel function and displays various images based on control by the control unit 12. For example, when the control unit 12 operates in conjunction with the navigation device 14, the display operating unit 13 displays a route guide image by the navigation device 14 or the like.

Next, a configuration of the portable terminal device 1 will be described. The portable terminal device 1 includes a communication unit 2, a display operating unit 3, an imaging unit 4, a gyroscopic sensor 5, a control unit 6, and a storage unit 7 as illustrated in FIG. 2.

For example, the storage unit 7 includes a non-volatile memory device such as a flash memory. The storage unit 7 stores position information 71, map information 72, operation image 73, imaging image 74, and the like. Here, the position information 71 is information representing the current position of the portable terminal device 1, and the map information 72 is image information corresponding to a nationwide map.

Here, when the display operating unit 3 functions as an operating unit operated by the user, the operation image 73 is image information displayed on the display operating unit 3, and the imaging image 74 is image information of the picture imaged by the imaging unit 4.

The communication unit 2 is a communication interface that transmits or receives various kinds of information to or from the in-vehicle device 10. In other words, the communication unit 2 is a processing unit that outputs various kinds of information input from the control unit 6 to the in-vehicle device 10, and outputs various kinds of information input from the in-vehicle device 10 to the control unit 6.

The communication unit 2 includes a disconnection detecting unit 21. Here, the disconnection detecting unit 21 is a processing unit that, when it is detected that a communication path with the in-vehicle device 10 has been disconnected by the user, outputs detection information representing the fact to the control unit 6.

The display operating unit 3 is a display device that includes a touch panel function and displays various images based on control by the control unit 6. The imaging unit 4 is a camera which is the same as installed in a general mobile telephone. The imaging unit 4 images (captures) an image (a picture) based on the user's operation on the display operating unit 3, and causes the imaged image (imaging image) to be stored in the storage unit 7.

The gyroscopic sensor 5 is a sensor that detects an angle and an angular velocity of the portable terminal device 1. The gyroscopic sensor 5 calculates an inclination of the portable terminal device 1 based on the detected angle and angular velocity of the portable terminal device 1, and outputs direction information representing a calculated direction to the control unit 6.

The control unit 6 includes an information processing device that includes a CPU, a ROM, and a RAM. The control unit 6 includes a plurality of processing units that function as the CPU reads the parking position guiding program from the ROM, and executes the parking position guiding program using the RAM as a work area.

Specifically, the control unit 6 includes a getting-off determining unit 61, a position information acquiring unit 62, a GPS (Global Positioning System) receiving unit 63, an accuracy determining unit 64, a warning unit 65, a vehicle position guide unit 66, and a remote control unit 67.

The getting-off determining unit 61 is a processing unit that determines whether the user gets off the vehicle based on the detection information input from the disconnection detecting unit 21 or various kinds of information input from the in-vehicle device 10. For example, when the detection information representing that the communication path with the in-vehicle device 10 has been disconnected is input from the disconnection detecting unit 21, the getting-off determining unit 61 determines that the user gets off the vehicle.

Further, when information representing that the ACC switch 15 of the vehicle has been turned off is input from the in-vehicle device 10, the getting-off determining unit 61 determines that the user gets off the vehicle.

In addition, the getting-off determining unit 61 may be configured to determine that the user gets off the vehicle even in other cases such as when a seating sensor (not illustrated) installed in a seat of a vehicle detects the user's leaving the seat or when it is detected that a shift lever of a vehicle is shifted to a parking position.

Then, when it is determined that the user gets off the vehicle, the getting-off determining unit 61 outputs determination information representing the fact to the position information acquiring unit 62.

Here, when the determination information representing that the user gets off the vehicle is input from the getting-off determining unit 61, the position information acquiring unit 62 acquires the position information 71 representing the current position of the portable terminal device 1 from the GPS receiving unit 63 and thus acquires the position information 71 representing the current position of the vehicle at the time of getting off. In addition, the position information acquiring unit 62 can acquire the position information 71 representing the current position of the vehicle from the navigation device 14 mounted in the vehicle through the in-vehicle device 10.

Further, even after the getting-off determining unit 61 determines that the user gets off the vehicle, the position information acquiring unit 62 acquires the position information 71 representing the current position of the portable terminal device 1 with a predetermined period. Then, the position information acquiring unit 62 outputs the acquired position information 71 to the accuracy determining unit 64.

The GPS receiving unit 63 is a processing unit that receives a signal transmitted from a GPS satellite, and calculates the position information 71 representing the current position of the portable terminal device 1 based on the received signal. The GPS receiving unit 63 outputs the calculated position information 71 to the position information acquiring unit 62.

The accuracy determining unit 64 calculates the accuracy (hereinafter, referred to as "position accuracy") on how accurately the position information 71 input from the position information acquiring unit 62 represents the current position of the portable terminal device 1. For example, the accuracy determining unit 64 determines a circular area corresponding to a geographical area by which the current position of the portable terminal device 1 can be specified based on the position information 71 input from the position information acquiring unit 62, and calculates shortness of the diameter of the circular area (for example, a reciprocal of the diameter) as the position accuracy.

At this time, the position accuracy calculated by the accuracy determining unit 64 decreases as the signal level or the reception frequency of the signal received from the GPS satellite decreases. Here, when the calculated position accuracy satisfies predetermined position accuracy, for example, when the calculated position accuracy is a predetermined threshold value or more, the accuracy determining unit 64 determines that the position accuracy is good.

Meanwhile, when the position accuracy is less than the predetermined threshold value, the accuracy determining unit 64 determines that the position accuracy is bad. Further, even when it is difficult for the GPS receiving unit 63 to receive the signal from the GPS satellite, the accuracy determining unit 64 determines that the position accuracy is less than the predetermined threshold value, and determines that the position accuracy is bad.

The accuracy determining unit 64 causes the position information 71 determined as having the good position accuracy to be stored in the storage unit 7. Meanwhile, when it is determined that the position accuracy is bad, the accuracy determining unit 64 outputs determination information representing the fact to the warning unit 65.

The accuracy determining unit 64 causes the position information 71 determined as having the good position accuracy at the time of getting-off of the user and the position information 71 which is determined as having the bad position accuracy at the time of getting-off of the user and then determined as having the good position accuracy to be continuously stored in the storage unit 7 until a communication path between the portable terminal device 1 and the in-vehicle device 10 is re-established.

Meanwhile, regarding the position information 71 other than the two pieces of position information 71, whenever it is newly determined that the position accuracy is good, the accuracy determining unit 64 overwrites the position information 71 which is newly determined as having the good position accuracy on the position information 71 previously stored in the storage unit 7, and holds the overwritten position information 71.

The warning unit 65 is a processing unit that causes a warning image to encourage the user to capture an image of a surrounding area to be displayed on the display operating unit 3 when the determination information representing that the position accuracy is bad is input from the accuracy determining unit 64.

In other words, the warning unit 65 functions as a notifying unit that gives a notice the user of the portable terminal device 1 to capture an image of a surrounding area. A concrete example of the warning image displayed by the warning unit 65 will be described later with reference to FIGS. 4A and 4B. The warning unit 65 may outputs a message to encourage the user to capture an image of a surrounding area through voice output.

The vehicle position guide unit 66 is a processing unit that generates a guide image used to assist the search of the parking position using various kinds of information stored in the storage unit 7 and causes the guide image to be displayed on the display operating unit 3 when the user operates the display operating unit 3 and requests assistance for the search of the parking position in order to go back to the parking position.

Further, when the guide image is displayed, the vehicle position guide unit 66 causes the guide image to be displayed according to the direction of the portable terminal device 1 changed by the user and the storage state of the position information 71 or the imaging image 74 in the storage unit 7.

In a state in which the portable terminal device 1 and the in-vehicle device 10 are within a predetermined distance in which wireless communication is performed, when the user operates the display operating unit 3 and requests remote control which will be described later, the vehicle position guide unit 66 causes the operation image 73 for remote control to be displayed on the display operating unit 3. A displace form of the guide image and the operation image 73 by the vehicle position guide unit 66 will be described later with reference to FIGS. 3A to 3I.

The remote control unit 67 is a processing unit that remotely controls operations of various kinds of vehicle-mounted devices by outputting control information according to the user's operation to the in-vehicle device 10 when the user operates the operation image 73 for remote control displayed on the display operating unit 3.

For example, the remote control unit 67 performs door-locking or door-unlocking of the vehicle by the door lock switch 16, engine start-up, control of a car air conditioner, blinking of a hazard lamp, sound output by a horn, or the like through remote control.

Next, the display form of the guide image and the operation image 73 by the vehicle position guide unit 66 will be described with reference to FIGS. 3A to 3I. FIGS. 3A to 3I are diagrams for describing the display form of the guide image and the operation image 73 by the vehicle position guide unit 66 according to the present embodiment.

Figure 3A:
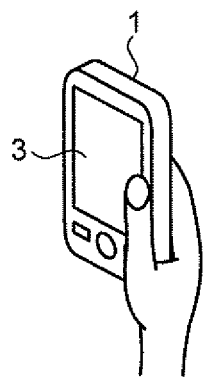
FIG. 3A is a diagram for describing a displace form of a guide image and an operation image by a vehicle position guide unit according to the present embodiment.
Figure 3B:
FIG. 3B is a diagram for describing a displace form of a guide image and an operation image by a vehicle position guide unit according to the present embodiment.

Here, the description will proceed with an example in which the position information 71 representing the current position of the vehicle is stored in the storage unit 7. In this case, it is assumed that after the user operates the display operating unit 3 and requests assistance for the search of the parking position, the long side of the display operating unit 3 is held in a vertical direction when seen from the user in a state in which the portable terminal device 1 is erected as illustrated in FIGS. 3A and 3B.

Figure 3C:
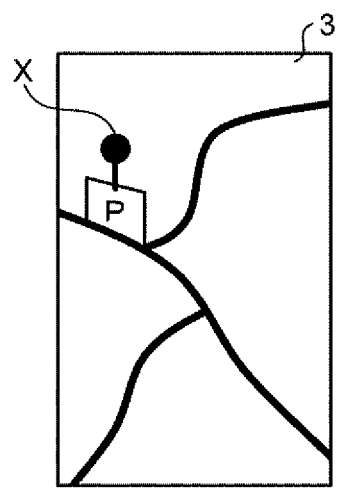
FIG. 3C is a diagram for describing a displace form of a guide image and an operation image by a vehicle position guide unit according to the present embodiment.

In this case, the vehicle position guide unit 66 causes a map image in which a pin mark X is added to a parking position of a vehicle to be displayed on the display operating unit 3 as the guide image based on the position information 71 stored in the storage unit 7 as illustrated in FIG. 3C.

As described above, the position information 71 representing the current position of the portable terminal device 1 is sequentially updated and stored in the storage unit 7. As a result, the vehicle position guide unit 66 can update the guide image illustrated in FIG. 3C according to movement of the portable terminal device 1 in the form of a display image of the navigation device 14.

As a result, for example, when the vehicle is present at a place in which the vehicle does not come into a field of view from the current position at all, the user can easily move to the parking position according to the guide image illustrated in FIG. 3C.

Figure 3D:
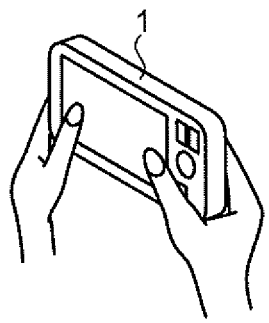
FIG. 3D is a diagram for describing a displace form of a guide image and an operation image by a vehicle position guide unit according to the present embodiment.
Figure 3E:
FIG. 3E is a diagram for describing a displace form of a guide image and an operation image by a vehicle position guide unit according to the present embodiment.

Meanwhile, let us assume that the short side of the display operating unit 3 is held in the vertical direction when seen from the user in a state in which the user erects the portable terminal device 1 as illustrated in FIGS. 3D and 3E. In this case, the vehicle position guide unit 66 causes the imaging unit 4 to image a surrounding area, and causes a guide image in which a direction image 30 indicating a parking position (current position) of a vehicle R parked by the user is added to an image (video) which is being imaged to be displayed on the display operating unit 3 based on the position information 71 as illustrated in FIG. 3F.

At this time, the vehicle position guide unit 66 may calculate the distance to the parking position based on the position information 71 representing the current position of the portable terminal device 1 and the position information 71 representing the parking position of the vehicle R, and cause the calculated distance to be displayed on the guide image in a superimposed manner.

Figure 3F:
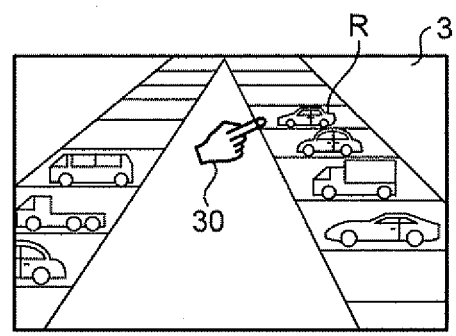
FIG. 3F is a diagram for describing a displace form of a guide image and an operation image by a vehicle position guide unit according to the present embodiment.

As a result, the user can easily move to the parking position while referring to the direction image 30 illustrated in FIG. 3F when the user moves to a place in which the vehicle R can be seen from his/her current position.

Figure 3G:
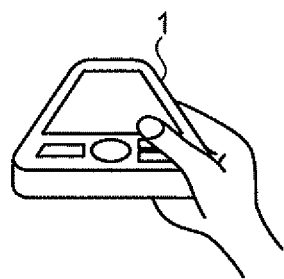
FIG. 3G is a diagram for describing a displace form of a guide image and an operation image by a vehicle position guide unit according to the present embodiment.
Figure 3H:
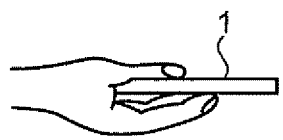
FIG. 3H is a diagram for describing a displace form of a guide image and an operation image by a vehicle position guide unit according to the present embodiment.

Further, let us assume that the user gets closer to the parking position of the vehicle R, and thus the distance between the portable terminal device 1 and the in-vehicle device 10 of the vehicle R is within a predetermined distance in which wireless communication can be performed. Further, let us assume that the long side of the display operating unit 3 is held in the vertical direction when seen from the user in a state in which the user lays the portable terminal device 1 down as illustrated in FIGS. 3G and 3H.

Figure 3I:
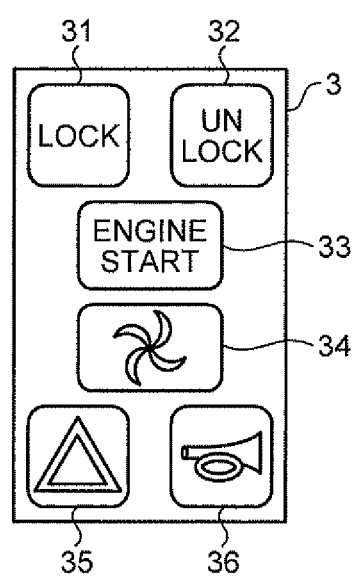
FIG. 3I is a diagram for describing a displace form of a guide image and an operation image by a vehicle position guide unit according to the present embodiment.

In this case, the vehicle position guide unit 66 causes the operation image 73 for remote control to be displayed on the display operating unit 3 as illustrated in FIG. 3I. Here, when the user touches a LOCK button 31 in a state in which the operation image 73 is displayed, the door lock switch 16 of the vehicle R is locked according to control by the remote control unit 67.

Similarly, the door lock switch 16 is unlocked when the user touches an UNLOCK button 32, an engine starts up when the user touches an ENGINE START button 33, and a car air conditioner starts up when the user touches an air-conditioner button 34.

Particularly, the operation image 73 for remote control is provided with a hazard button 35 and a horn button 36. Here, a hazard lamp blinks when the user touches the hazard button 35, and a horn outputs a sound when the user touches the horn button 36.

Thus, when the portable terminal device 1 gets close up to a predetermined distance in which wireless communication with the in-vehicle device 10 can be performed, the portable terminal device 1 causes the user to operate the hazard button 35 and thus can assist the search of the parking position by blinking of a hazard lamp. Similarly, the portable terminal device 1 causes the user to operate the horn button 36 and thus can assist the search of the parking position through a sound generated from the horn.

Figure 4B:
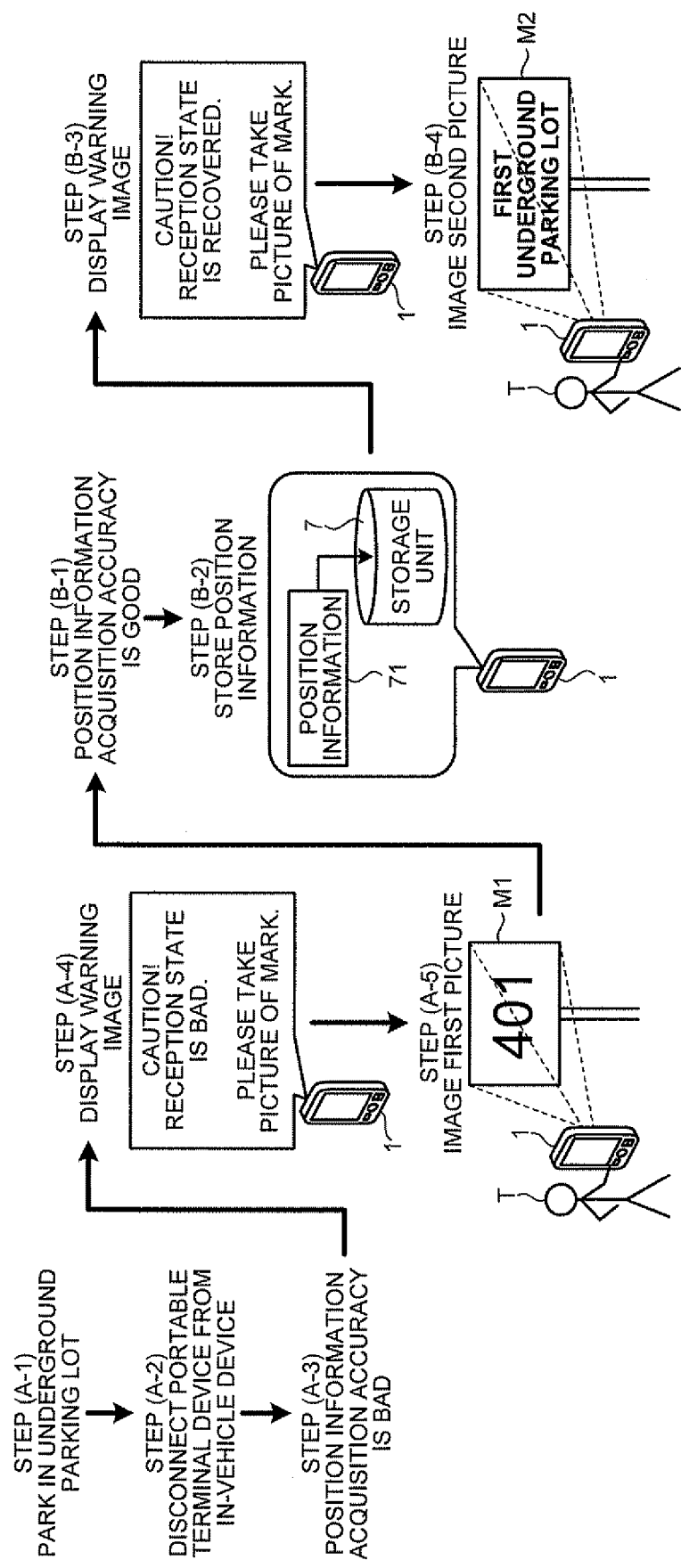
FIG. 4B is a diagram illustrating an operation of a portable terminal device when a user parks a vehicle and gets off according to the present embodiment.

Next, an operation of the portable terminal device 1 will be described with reference to FIGS. 4A and 4B and FIGS. 5A and 5B. FIGS. 4A and 4B are diagrams illustrating an operation of the portable terminal device 1 when a user T parks the vehicle R and gets off according to the present embodiment. FIGS. 5A and 5B are diagrams illustrating an operation of the portable terminal device 1 when the user T goes back to the parked vehicle R according to the present embodiment.

Here, the description will proceed with an example in which the user T parks the vehicle R in an underground parking lot in which a signal from a GPS satellite Q is not received. First, an example in which the user T parks the vehicle R and gets off will be described. For example, it is assumed that the user T parks the vehicle R in an underground parking lot (here, the first underground parking lot) as illustrated in step (A-1) of FIGS. 4A and 4B.

Next, as illustrated in FIG. 4B, when the user T gets off and disconnects a communication path between the portable terminal device 1 and the in-vehicle device 10 (see step (A-2)), the portable terminal device 1 acquires the position information 71 representing the current position of the vehicle R (see step (A-3)).

At this time, since the portable terminal device 1 is in the underground, it is difficult for the portable terminal device 1 to receive the signal from the GPS satellite Q. Thus, the portable terminal device 1 determines that the position accuracy of the acquired position information 71 is bad (see step (A-3)).

Next, the portable terminal device 1 causes the warning image to be displayed on the display operating unit 3 (see step (A-4)). For example, the portable terminal device 1 causes a warning message such as "Caution! A reception state is bad. Please take a picture of a mark." to be displayed on the display operating unit 3.

Thus, for example, the user T takes a picture (a first picture) of a plate M1 used to identify a parking space serving as a mark of a parking position through the portable terminal device 1 (see step (A-5)). The first picture is stored in the storage unit 7 of the portable terminal device 1.

Next, when the user T leaves the vehicle R and moves to the ground as illustrated in FIG. 4A, the portable terminal device 1 can receive the signal from the GPS satellite Q. Thus, when the user T moves to the ground, the portable terminal device 1 acquires the position information 71 again on the ground as illustrated in FIG. 4B (see step (B-1)).

At this time, since the portable terminal device 1 can receives the signal from the GPS satellite Q, the portable terminal device 1 determines that the position accuracy of the acquired position information 71 is good (see step (B-1)). Next, the portable terminal device 1 stores the position information 71 determined as having the good position accuracy in the storage unit 7 (see step (B-2)).

In addition, the portable terminal device 1 causes the warning image to be displayed on the display operating unit 3 again on the ground (see step (B-3)). At this time, for example, the portable terminal device 1 causes a warning message such as "Caution! A reception state is recovered. Please take a picture of a mark." to be displayed on the display operating unit 3.

As a result, for example, the user T takes a picture (a second picture) of a mark (here, a signboard M2 of the first underground parking lot) of a spot at which the reception state of the signal from the GPS satellite Q is recovered through the portable terminal device 1 (see step (B-4)). The second picture is stored in the storage unit 7 of the portable terminal device 1.

Next, the description will proceed with an example in which the user T goes back to the parked vehicle R. For example, it is assumed that the user T is moving on an A spot from which the first underground parking lot is not seen as illustrated in step (A-1) of FIG. 5A. In this case, the portable terminal device 1 can assist the search of the parking position by causing the map in which the pin mark X is added to the parking position of the vehicle R to be displayed on the display operating unit 3 as illustrated in step (A-2) of FIG. 5B.

As a result, the user T can easily moves up to the first underground parking lot which is not seen while referring to the guide by the map.

Next, it is assumed that the user T is moving on a B spot from which the signboard M2 of the first underground parking lot is seen as illustrated in step (B-1) of FIG. 5A. In this case, the portable terminal device 1 stores the position information 71 corresponding to the position at which the signboard M2 of the first underground parking lot is captured.

Thus, the portable terminal device 1 can assist the search of the parking position by causing the guide image in which the direction image 30 representing the direction of the signboard M2 of the first underground parking lot is added to the video which is being imaged by the imaging unit 4 to be displayed on the display operating unit 3 as illustrated in step (B-2) of FIG. 5B.

As a result, the user T can easily move up to the first underground parking lot in which the vehicle R is parked while referring to the guide by the video with the direction image 30.

As described above, even when it is difficult to acquire the position information 71 of the parking position, the portable terminal device 1 can accurately guide the user T up to the first underground parking lot.

Next, it is assumed that the user T is moving on a C spot near the signboard M2 of the first underground parking lot as illustrated in step (C-1) of FIG. 5A. In this case, the portable terminal device 1 can assist the search of the parking position by causing the second picture in which the signboard M2 of the first underground parking lot is captured to be displayed on the display operating unit 3 as illustrated in step (C-2) of FIG. 5B. As a result, the user T can easily recognize the position of the first underground parking lot in which the vehicle R is parked.

Next, it is assumed that the user T is moving on a D spot from which the vehicle R in the first underground parking lot is not seen as illustrated in step (D-1) of FIG. 5A. In this case, it is difficult for the portable terminal device 1 to receive the signal from the GPS satellite Q in the first underground parking lot, and thus it is difficult for the portable terminal device 1 to assist the search of the parking position using the position information 71.

At this time, the portable terminal device 1 stores the first picture obtained by capturing the plate M1 serving as the mark of the parking position when the user T gets off. Thus, the portable terminal device 1 can assist the search of the parking position by causing the first picture to be displayed on the display operating unit 3 as illustrated in step (D-2) of FIG. 5B. As a result, the user T can easily move up to the parking position while referring to the plate M1 shown in the first picture.

Next, it is assumed that the user T is moving on an E spot which is close to the parking position of the vehicle R as illustrated in step (E-1) of FIG. 5A. In this case, the portable terminal device 1 can cause the operation image 73 for remote control to be displayed on the display operating unit 3 as illustrated in step (E-2) of FIG. 5B.

As a result, the user T can touch, for example, the hazard button 35 or the horn button 36 and easily confirm the parking position of the vehicle R through the hazard lamp or the horn of the vehicle R.

Next, a process executed by the portable terminal device 1 will be described with reference to FIGS. 6 to 8. FIGS. 6 to 8 are flowcharts illustrating a process executed by the portable terminal device 1 according to the present embodiment.

FIGS. 6 and 7 illustrate a process executed by the portable terminal device 1 when the user T gets off the vehicle, and FIG. 8 illustrates a process executed by the portable terminal device 1 when the user T goes back to the parking position.

As illustrated in FIG. 6, the portable terminal device 1 determines whether it is detected that the user T gets off the vehicle (step S101), and when it is detected that the user gets off (Yes in step S101), the process proceeds to step S102. However, when it is not detected that the user gets off (No in step S101), the portable terminal device 1 ends the process.

Then, in step S102, the portable terminal device 1 acquires the position information 71. Next, it is determined whether the position accuracy is a predetermined threshold value or more (step S103), and when it is determined that the position accuracy is a predetermined threshold value or more (Yes in step S103), the position information 71 is stored (step S104), and the process ends.

However, when it is determined that the position accuracy is less than the predetermined threshold value (No in step S103), the portable terminal device 1 displays the warning image (step S105), and then determines whether the user T performs an imaging operation (step S106).

Here, when it is determined that the user T performs an imaging operation (Yes in step S106), the portable terminal device 1 perform an imaging operation (step S107), then stores an imaging image (step S108), and ends the process. However, when it is determined that the user T does not perform an imaging operation (No in step S106), the portable terminal device 1 ends the process.

Then, the portable terminal device 1 repeatedly executes the process illustrated in FIG. 6 while electric power is being supplied. Further, the portable terminal device 1 executes the process illustrated in FIG. 7 in parallel with the process illustrated in FIG. 6.

In other words, as illustrated in FIG. 7, the portable terminal device 1 determines whether the position information 71 has been acquired (step S201), and when it is determined that the position information 71 has been acquired (Yes in step S201), the process proceeds to step S202. However, when it is determined that the position information 71 has not been acquired (No in step S201), the portable terminal device 1 ends the process.

In step S202, the portable terminal device 1 determines whether the position accuracy of the position information 71 acquired in step S201 is a predetermined threshold value or more, and when it is determined that the position accuracy of the position information 71 is the predetermined threshold value or more (Yes in step S202), the process proceeds to step S203. However, it is determined that the position accuracy of the position information 71 is less than the predetermined threshold value (No in step S202), the portable terminal device 1 ends the process.

In step S203, the portable terminal device 1 stores the position information 71 in which it is determined in step S202 that the position accuracy is the threshold value or more, then displays the warning image (step S204), and causes the process to proceed to step S205.

In step S205, the portable terminal device 1 determines whether the user T has performed an imaging operation, and when it is determined that the user T has performed an imaging operation (Yes in step S205), the portable terminal device 1 performs an imaging operation (step S206), then stores an imaging image (step S207), and ends the process.

However, when it is determined that the user T has not performed an imaging operation (No in step S205), the portable terminal device 1 ends the process. Then, the portable terminal device 1 repeatedly executes the process illustrated in FIG. 7 while electric power is being supplied.

Further, the portable terminal device 1 executes the process illustrated in FIG. 8 in parallel with the processes illustrated in FIGS. 6 and 7. In other words, the portable terminal device 1 determines whether an operation (a guide request operation) to request assistance for a search of a parking position has been made (step S301) as illustrated in FIG. 8.

Here, when it is determined that the guide request operation has been made (Yes in step S301), the portable terminal device 1 causes the process to proceed to step S302. However, when it is determined that the guide request operation has not been made (No in step S301), the portable terminal device 1 ends the process.

In step S302, the portable terminal device 1 determines whether there are stored position information 71 (stored position information) and a stored imaging image (a stored image). Here, when it is determined that there are the stored position information and the stored image (Yes in step S302), the portable terminal device 1 displays a vehicle position or an image according to the user T's operation (step S303).

In other words, the portable terminal device 1 displays the map image to which the position of the vehicle R is added, an image to which the direction image 30 indicating the vehicle R is added, which is being captured, or the stored image in which the mark captured by the user T is shown according to the direction of the portable terminal device 1 held by the user T, and then ends the process.

Meanwhile, when only any one of the stored position information and the stored image is stored (No in step S302), the portable terminal device 1 determines whether there is stored position information (step S304).

Here, when it is determined that there is stored position information (Yes in step S304), the portable terminal device 1 displays the vehicle position according to the user's operation (step S305), and then ends the process.

In other words, the portable terminal device 1 displays the map image to which the position of the vehicle R is added or an image to which the direction image 30 indicating the vehicle R is added, which is being captured according to the direction of the portable terminal device 1 held by the user T, and then ends the process.

Meanwhile, when it is determined that there is no stored position information (No in step S304), the portable terminal device 1 determines whether there is a stored image (step S306). Here, when it is determined that there is a stored image (Yes in step S306), the portable terminal device 1 displays the stored image (step S307), and then ends the process.

In other words, the portable terminal device 1 displays the stored image in which the mark captured by the user T is shown, and then ends the process. Meanwhile, when it is determined that there is no stored image (No in step S306), the portable terminal device 1 performs a guide impossible display (step S308), and then ends the process.

At this time, for example, the portable terminal device 1 causes a message such as "It is impossible to guide a parking position of a vehicle." to be displayed on the display operating unit 3, and then ends the process. Then, the portable terminal device 1 repeatedly executes the process illustrated in FIG. 8 while electric power is being supplied.

The present embodiment has been described in connection with an example in which the user T is encouraged to capture an image of a surrounding area through the warning image, but the present invention is not limited to this example. For example, a message to encourage the user to capture an image of a surrounding area may be voice-output from the portable terminal device 1.

As described above, if the position accuracy of the acquired position information is bad when the user parks the vehicle, the portable terminal device according to the present embodiment encourages the user to take a picture of a mark of a parking position and thus can cause an image of a surrounding area to be captured.

Thus, according to the portable terminal device of the present embodiment, even when a vehicle is parked at a place in which it is difficult to specify a parking position of a vehicle from position information, it is possible to assist a search of a parking position by an image of an area around a parking position captured by the user.

Further, in the present embodiment, when the position accuracy of the acquired position information is a predetermined threshold value or more, the portable terminal device stores position information. However, the portable terminal device may be configured to store the position information even when the position accuracy is less than the predetermined threshold value.

In this configuration, the portable terminal device displays the guide image by which the parking position is roughly specified, but when the user is in a place extremely far from the parking position, it is possible to guide the user up to a rough area including the parking position.

Reference Signs List
1, 101 Portable terminal device
2 Communication unit
21 Disconnection detecting unit
3 Display operating unit
4 Imaging unit
5 Gyroscopic sensor
6 Control unit
61 Getting-off determining unit
62 Position information acquiring unit
63 GPS receiving unit
64 Accuracy determining unit
65 Warning unit
66 Vehicle position guide unit
67 Remote control unit
7 Storage unit
71 Position information
72 Map information
73 Operation image
74 Imaging image
10 In-vehicle device
11 Communication unit
12 Control unit
13 Display operating unit
14 Navigation device
15 ACC switch
16 Door lock switch
T User
R Vehicle
Q GPS satellite

The invention claimed is:

1. A portable terminal device comprising:
a processor configured to execute a process, including:
first determining of an accuracy of acquired position information; and
giving a notice to a user of the portable terminal device to capture an image of a surrounding area when the accuracy determined at the first determining does not satisfies a predetermined accuracy; and
second determining of whether the user of the portable terminal device gets off the vehicle based on whether detection information representing that a communication path with an in-vehicle device has been disconnected is input from a disconnection detector,
wherein the position information represents a current position of a vehicle to accurately assist search of a parking position of the vehicle when the user goes back to the parking position, and
the first determining includes determining a circular area corresponding to a geographical area by which the current position of the portable terminal device can be specified based on the acquired position information and calculating position accuracy based on a diameter of the circular area to determine the accuracy of the position information, and the first determining includes determining the accuracy of the position information acquired when it is determined that the user gets off at the second determining.

2. The portable terminal device according to claim 1, wherein,
the process further includes:
storing, in a storage device, the position information in which it is determined that the accuracy satisfies the predetermined accuracy during the first determining; and
causing an image in which a direction image indicating a current position of the vehicle is added to an image which is being imaged to be displayed on a predetermined display based on the position information when the position information remains stored in the storage device, and causing an image of a surrounding area to be displayed on the predetermined display when the position information does not remain stored in the storage device and the image of the surrounding area is being imaged.

3. The portable terminal device according to claim 1, wherein,
the process further includes performing communication with the in-vehicle device mounted in the vehicle, and
the second determining includes determining that the user gets off the vehicle when the communication path between the portable terminal device and the in-vehicle device is disconnected or supply of electric power to the in-vehicle device is stopped.

4. The portable terminal device according to claim 1, wherein
the first determining includes determining the accuracy of the position information when the user gets off the vehicle, and then determining the accuracy of the position information when the position information is newly acquired, and
when it is determined that the accuracy of the position information newly acquired satisfies the predetermined accuracy at the first determining, the giving includes giving a notice to the user of the portable terminal device again to capture an image of a surrounding area, and causing the position information to be stored in the storage device.

5. A computer readable, non-transitory storage medium having stored therein a parking position guiding program for guiding a parking position of a vehicle using a portable terminal device including an imaging unit and a position information acquiring unit that acquires position information, the program causing a computer to execute a process comprising:
determining an accuracy of the position information acquired by the position information acquiring unit;
giving a notice to a user of the portable terminal device to capture an image of a surrounding area when the accuracy determined by the determining of the accuracy does not satisfy a predetermined accuracy; and determining whether the user of the portable terminal device gets off the vehicle based on whether detection information representing that a communication path with an in-vehicle device has been disconnected is input from a disconnection detector, wherein the position information represents a current position of a vehicle to accurately assist search of the parking position of the vehicle when the user goes back to the parking position, and the determining includes determining a circular area corresponding to a geographical area by which the current position of the portable terminal device can be specified based on the acquired position information and calculating position accuracy based on a diameter of the circular area to determine the accuracy of the position information, and determining the accuracy of the position information includes determining the accuracy of the position information when it is determined that the user gets off the vehicle.

\* \* \* \* \*